United States Patent [19]

Inoue et al.

[11] 4,276,541

[45] Jun. 30, 1981

[54] DISPLAY CONTROL OF HAND-WRITTEN, MEMORIZED PATTERN AT A PRESELECTED TIME

[75] Inventors: Tomohiro Inoue, Yoshino; Akira Tanimoto, Kashihara; Isamu Washizuka, Soraku, all of Japan

[73] Assignee: Sharp Kabushiki Kaisha, Osaka, Japan

[21] Appl. No.: 14,725

[22] Filed: Feb. 23, 1979

[30] Foreign Application Priority Data

Feb. 24, 1978 [JP] Japan .................................. 53-21090

[51] Int. Cl.³ .......................... G04C 23/00; G06K 9/00
[52] U.S. Cl. .......................... 340/146.3 SY; 364/900; 368/9; 368/108; 368/251
[58] Field of Search .................. 340/146.3 SY, 311; 360/12; 58/152 R; 178/30, 18; 364/900

[56] References Cited

U.S. PATENT DOCUMENTS

| | | | |
|---|---|---|---|
| 3,999,050 | 12/1976 | Pitroda | 364/900 |
| 4,005,400 | 1/1977 | Engdahl | 340/146.3 SY |
| 4,047,010 | 9/1977 | Perotto et al. | 340/146.3 SY |
| 4,070,649 | 1/1978 | Wright, Jr. et al. | 340/146.3 SY |
| 4,070,697 | 1/1978 | Miller et al. | 360/12 |
| 4,101,742 | 7/1978 | Craig et al. | 360/12 |
| 4,117,542 | 9/1978 | Klausner et al. | 364/900 |

*Primary Examiner*—Leo H. Boudreau
*Attorney, Agent, or Firm*—Birch, Stewart, Kolasch & Birch

[57] ABSTRACT

A hand-written pattern is introduced through a matrix input means and stored in a matrix memory. An alarm time is set and stored in an alarm time memory. A detection circuit develops a detection output when the current time reaches the alarm time set in the alarm time memory. In response to the detection output, the hand-written pattern stored in the matrix memory is read out and displayed on a matrix display panel.

17 Claims, 3 Drawing Figures

DISPLAY CONTROL OF HAND-WRITTEN, MEMORIZED PATTERN AT A PRESELECTED TIME

BACKGROUND AND SUMMARY OF THE INVENTION

The present invention relates to an electronic apparatus, which can display a hand-written pattern at a preselected time.

The present invention relates, more particularly, to a combination timepiece and calculator, which can display a hand-written, memorized pattern on a matrix display panel at a preselected time.

An electronic apparatus has been developed, which includes a matrix display panel and a matrix input means. A desired hand-written pattern is introduced into the electronic apparatus through the matrix input means, and the thus introduced hand-written pattern is displayed on the matrix display panel.

Accordingly, an object of the present invention is to provide a display control system for displaying a hand-written, memorized pattern at a preselected time.

Another object of the present invention is to provide a combination timepiece and calculator, which can display a hand-written, memorized pattern at a preselected time.

Other objects and further scope of applicability of the present invention will become apparent from the detailed description given hereinafter. It should be understood, however, that the detailed description and specific examples, while indicating preferred embodiments of the invention, are given by way of illustration only, since various changes and modifications within the spirit and scope of the invention will become apparent to those skilled in the art from this detailed description.

To achieve the above objects, pursuant to an embodiment of the present invention, a combination timepiece and calculator comprises a matrix display panel, and a matrix shaped input means for introducing a desired hand-written pattern into the combination timepiece and calculator. The introduced hand-written pattern is stored in a matrix memory, which includes memory sections corresponding to the matrix display panel. The matrix shaped input means includes matrix elements corresponding to one digit of the matrix memory.

The combination timepiece and calculator further comprises a current time information keeping circuit, and a storage means for storing a preselected time information. A desired time is introduced into the storage means, at which the hand-written, memorized pattern is desired to be displayed on the matrix display panel. A detection circuit develops a display control signal when the preselected time stored in the storage means is identical with the current time information calculated by the current time information keeping circuit, whereby the hand-written pattern stored in the matrix memory is displayed on the matrix display panel.

In a preferred form, an audio alarm system is provided for developing an alarm sound when the display control signal is developed from the detection circuit.

In another preferred form, a computation result stored in a computation circuit of the combination timepiece and calculator is displayed on the matrix display panel.

BRIEF DESCRIPTION OF THE DRAWINGS

The present invention will be better understood from the detailed description given hereinbelow and the accompanying drawings which are given by way of illustration only, and thus are not limitative of the present invention and wherein.

DESCRIPTION OF THE PREFERRED EMBODIMENTS

Figure 1:
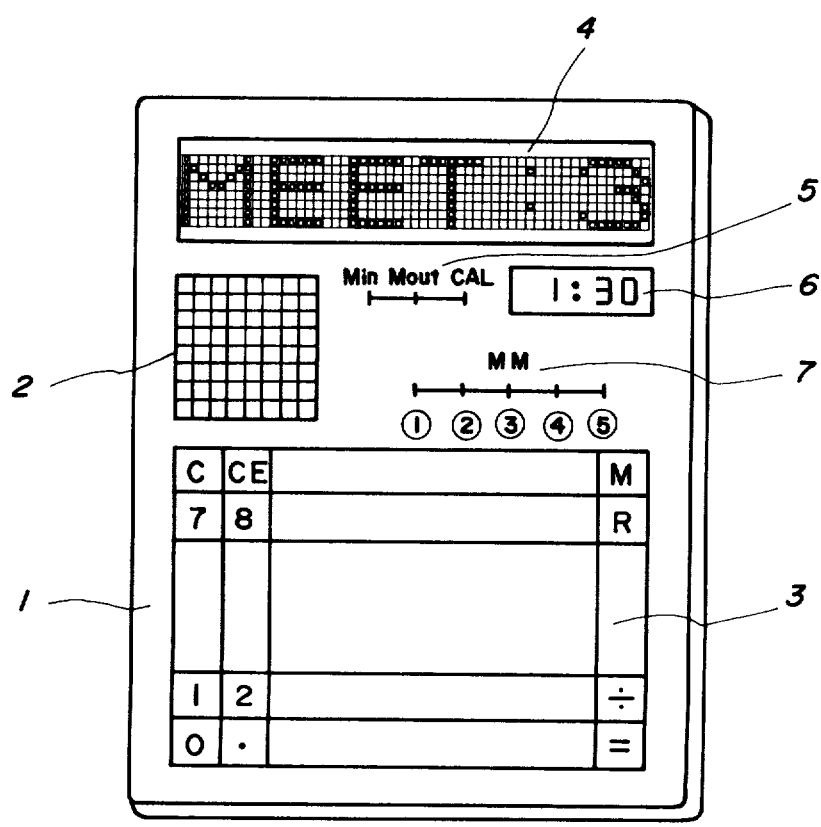
FIG. 1 is a plan view of an embodiment of a combination timepiece and calculator of the present invention.

FIG. 1 shows a combination timepiece and calculator employing an embodiment of a display control system of the present invention.

An electronic timepiece and calculator 1 mainly comprises a matrix aligned input means 2, a keyboard panel 3, and a dot matrix display panel 4. The matrix aligned input means 2 comprises 8×8 sensing elements aligned in a matrix fashion. When a desired pattern is described on the matrix aligned input means 2 by an operator's finger or with a pen, the thus hand-written pattern is introduced into the electronic timepiece and calculator 1. In a preferred form, the matrix aligned input means 2 comprises 8×8 touch sensitive switching elements for detecting the touch operation conducted by the operator's finger. In another preferred form, the matrix aligned input means 2 comprises 8×8 light-responsive elements for detecting input operation conducted thereto through the use of an input pen.

The dot matrix display panel 4 comprises a liquid crystal matrix display panel. Or, the dot matrix display panel 4 comprises an electroluminescent matrix display panel. In another form, the dot matrix display panel 4 may comprise a light emitting diode matrix panel. The dot matrix display panel 4 comprises, for example, 6 digit positions, each digit position comprising 8×8 matrix display elements, which correspond to the 8×8 sensing elements included in the matrix aligned input means 2. More specifically, a desired pattern to be displayed on the dot matrix display panel 4 is introduced through the matrix aligned input means 2 in a one digit by one digit fashion.

The keyboard panel 3 includes numeral keys and function keys for conducting calculator operation, various mode keys for conducting a timepiece function, and various control instruction keys for controlling the display system of the present invention.

The electronic timepiece and calculator 1 further comprises a mode selection switch 5, a time information display 6, and a block selection switch 7. The mode selection switch 5 includes three terminals, namely, a first terminal $M_{in}$ for determining a pattern input mode and an alarm time input mode, a second terminal $M_{out}$ for determining a pattern read out mode and an alarm time read out mode, and a third terminal CAL for determining a calculator mode.

The time information display 6 displays the current time information stored in a current time information keeping circuit or preselected time information (alarm time) stored in an alarm time storage means. The block selection switch 7 is provided for selecting a desired memory block in a matrix memory associated with the matrix aligned input means 2 and the dot matrix display panel 4, and for selecting a desired memory block of the alarm time storage means. In this example, the matrix memory and the alarm time storage means include five memory blocks and, therefore, the block selection switch 7 comprises five selection terminals ① through ⑤. More specifically, the electronic timepiece and calculator 1 can memorize five different kinds of information, and display the stored information at any one of five different selected times.

Figure 2A:
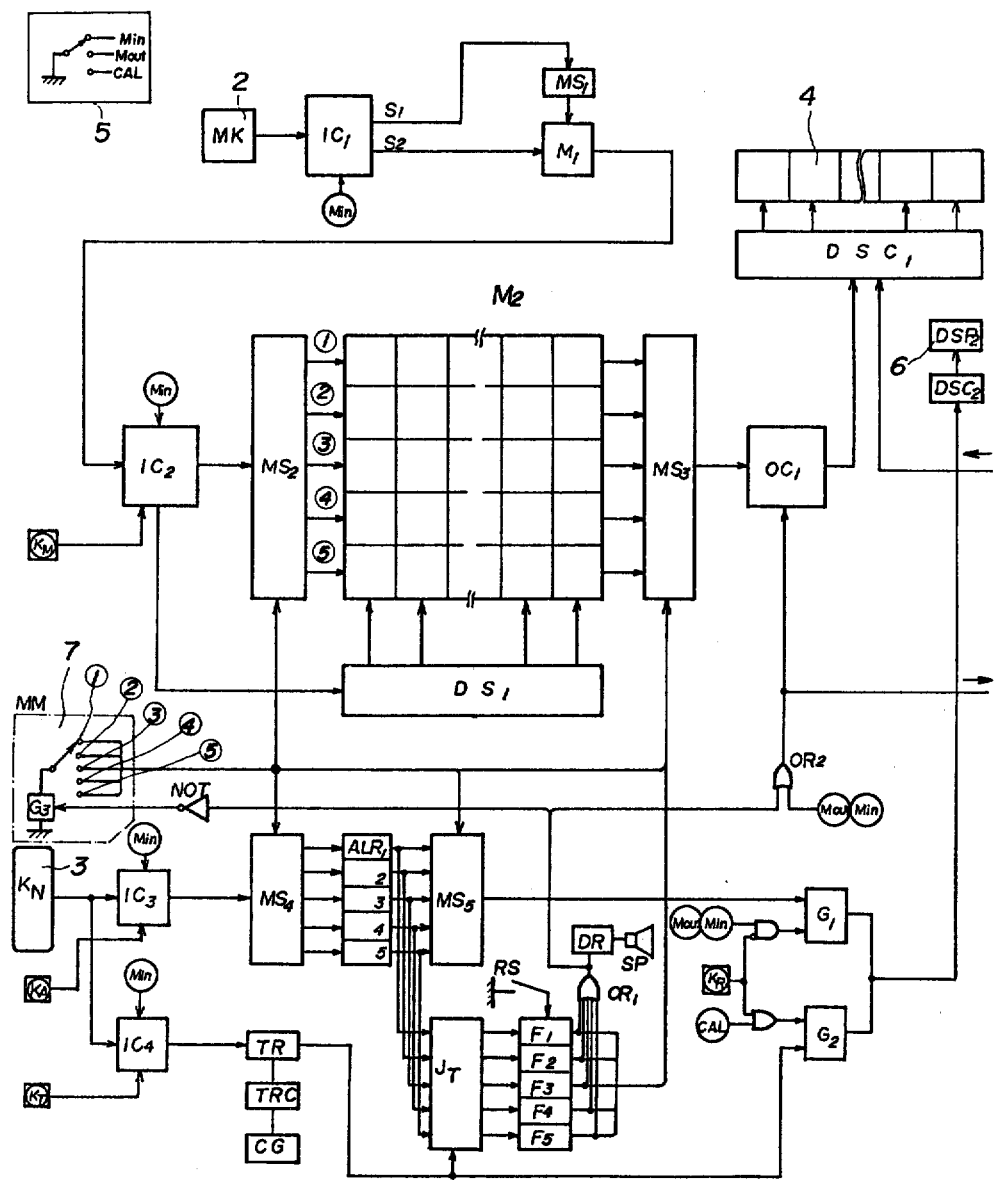
FIG. 2 (A) and 2(B) are block diagrams of a display control system of the present invention.
Figure 2B:
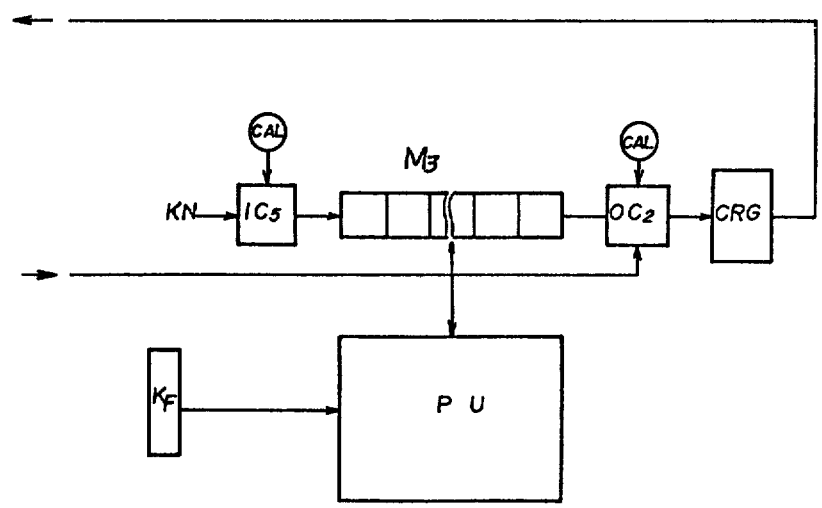

FIGS. 2(A) and 2(B) show the display control system of the present invention. Like elements corresponding to those of FIG. 1 are indicated by like numerals.

A one digit pattern introduced from the matrix aligned input means 2 is temporarily stored in a buffer matrix memory $M_1$ through an input control circuit $IC_1$. That is, the buffer matrix memory $M_1$ includes $8 \times 8$ memory elements corresponding to the sensing elements included in the matrix aligned input means 2. The input control circuit $IC_1$ develops a position selection signal $S_1$ and a data signal $S_2$. The position selection signal $S_1$ is applied to a position selection circuit $MS_1$, whereby the data signal $S_2$ is applied to a desired section in the buffer matrix memory $M_1$.

The thus introduced pattern data temporarily stored in the buffer matrix memory $M_1$ are applied to a matrix memory $M_2$ through a data introduce control circuit $IC_2$. The matrix memory $M_2$ comprises five blocks, each block comprising six digit positions. One digit position includes $8 \times 8$ memory sections corresponding to that of the buffer matrix memory $M_1$. The data introduced into control circuit $IC_2$ controls a memory digit selection circuit $DS_1$ and a memory block selection circuit $MS_2$, whereby the one digit pattern data temporarily stored in the buffer matrix memory $M_1$ are introduced and stored in a desired digit section of the matrix memory $M_2$.

The thus stored pattern data memorized in a desired block of the matrix memory $M_2$ are applied to a matrix display panel 4 through a memory block selection circuit $MS_3$, a data output control circuit $OC_1$ and a display driver circuit $DSC_1$. The memory block selection circuits $MS_2$ and $MS_3$ are responsive to an output signal from the block selection switch 7. The data introduced into control circuit $IC_2$ is responsive to an output signal from a control switch $K_M$, which is actuated upon completion of description of one digit pattern, whereby the pattern data is introduced into the matrix memory $M_2$ in a digit by digit fashion.

Current time information and alarm time information can be set through the keyboard panel 3. The keyboard panel 3 includes ten numeral keys $K_N$, an alarm set key $K_A$, and a current time set key $K_T$. An output signal of the alarm set key $K_A$ is applied to an alarm time set control circuit $IC_3$, which controls an alarm memory block selection circuit $MS_4$, whereby a desired alarm time is set in a desired block of an alarm time memory ALR. The alarm time memory ALR comprises five blocks $ALR_1$ through $ALR_5$. A desired block is selected by the block selection switch 7 and the alarm memory block selection circuit $MS_4$. The contents stored in the alarm time memory ALR are displayed on the time information display 6 through another alarm memory block selection circuit $MS_5$, a gate circuit $G_1$, and a display driver circuit $DSC_2$.

Current time information is stored in a current time information keeping circuit TR, which is associated with a clock generator CG through a pulse counter TRC. The current time information stored in the current time information keeping circuit TR can be corrected through the use of the ten numeral keys $K_N$ and the current time set key $K_T$ included in the keyboard panel 3. An output signal of the current time set key $K_T$ is applied to a current time set control circuit $IC_4$, which functions to introduce desired time information derived from the ten numeral keys $K_N$ into the current time information keeping circuit TR for correction purposes.

The contents stored in the alarm time memory ALR and the contents stored in the current time information keeping circuit TR are applied to a coincide detection circuit $J_T$ for comparison purposes. When, for example, the contents stored in the first block $ALR_1$ of the alarm time memory ALR are identical with that stored in the current time information keeping circuit TR, the coincide detection circuit $J_T$ develops a detection output for setting a first flip-flop $F_1$. Set output signals of flip-flops $F_1$ through $F_5$ are applied to a speaker driver circuit DR through an OR gate $OR_1$, thereby developing an alarm sound from a speaker SP.

The set outpt signals of the flip-flops $F_1$ through $F_5$ are also applied to the memory block selection circuit $MS_3$ in order to display the contents stored in the memory block in the matrix memory $M_2$ corresponding to the set flip-flops $F_1$ thrugh $F_5$ on the matrix display panel 4. More specifically, when, for example, the flip-flop $F_1$ is set, the contents stored in the first block of the matrix memory $M_2$ are displayed on the matrix display panel 4 via the memory block selection circuit $MS_3$, the data output control circuit $OC_1$, and the display driver circuit $DSC_1$. A reset switch RS is associated with the flip-flops $F_1$ through $F_5$. When the reset switch RS is actuated, the flip-flops $F_1$ through $F_5$ are reset to terminate the energization of the speaker SP and the matrix display panel 4.

A calculator section mainly comprises an operation register $M_3$. An input control circuit $IC_5$ and an output control circuit $OC_2$ are connected to the operation register $M_3$. An operation control circuit PU is associated with the operation register $M_3$, which functions to perform the arithmetic calculation in accordance with the contents stored in the operation register $M_3$ and instructions derived from function keys $K_F$ included in the keyboard panel 3. The contents stored in the operation register $M_3$ are displayed on the matrix display panel 4 through the output control circuit $OC_2$, a character pattern generator CRG, and the display driver circuit $DSC_1$.

In FIGS. 2(A) and 2(B), $M_{in}$, $M_{out}$, and CAL represent control signals, which are developed in response to operation modes selected by the mode selection switch 5. The current time information stored in the current time information keeping circuit TR is displayed on the time information display 6 through a gate circuit $G_2$ and the display driver circuit $DSC_2$.

Four different modes of operation of the display control system of the present invention will be described.

(I) PATTERN DISPLAY INTRODUCED THROUGH MATRIX ALIGNED INPUT MEANS 2

The mode selection switch 5 is held at the first terminal $M_{in}$. The input control circuit $IC_1$ is placed in the operative condition, and the position selection signal $S_1$ and the data signal $S_2$ are developed from the input control circuit $IC_1$ in response to the hand-written pattern described on the matrix aligned input means 2. The hand-written pattern is temporarily stored in the buffer matrix memory $M_1$. After completion of description of one pattern, the control switch $K_M$ is actuated to transfer the pattern data stored in the buffer matrix memory $M_1$ to the matrix memory $M_2$ through the data introduce control circuit $IC_2$.

In the case where the block selection switch 7 is positioned at the first terminal ①, the block selection circuit $MS_2$ selects the first block of the matrix memory $M_2$. Therefore, the written pattern data are introduced into the first digit of the first block of the matrix memory $M_2$. The thus introduced pattern data are applied to the display driver circuit $DSC_1$ through the block selection circuit $MS_3$ and the data output control circuit $OC_1$, whereby the written pattern is displayed at the first digit of the matrix display panel 4 in a dot matrix fashion.

The above-mentioned operation is repeated to complete introduction of a kind of information. In this example, the matrix memory $M_2$ and the matrix display panel 4 have a six-digit capacity and, therefore, the information up to six digits can be memorized and displayed. FIG. 1 shows an example, where information "MEET:3" is displayed on the matrix display panel 4 in the dot matrix fashion. The information represents that a meeting is held at a room No. 3. It will be clear that the operator can introduce desired information into the matrix memory $M_2$ while confirming through the matrix display panel 4.

(II) ALARM TIME SET AND CURRENT TIME CORRECTION

The mode selection switch 5 is held at the first terminal $M_{in}$. If the alarm time is desired to be set, the alarm time is introduced through the numeral keys $K_N$, and the alarm set key $K_A$ is actuated. The alarm time set control circuit $IC_3$ becomes operative upon actuation of the alarm set key $K_A$, and the alarm time is stored in the alarm time memory ALR via the alarm memory block selection circuit $MS_4$. In the case where the block selection switch 7 is positioned at the first terminal ①, the alarm time introduced through the keyboard panel 3 is stored in the first block $ALR_1$.

Since the alarm memory block selection circuits $MS_4$ and $MS_5$ are controlled by an output signal derived from the block selection switch 7, the thus introduced alarm time is displayed on the time information display 6 via the gate circuit $G_1$ and the display driver circuit $DSC_2$.

If the current time information is desired to be corrected, the current time information is introduced through the numeral keys $K_N$, and the current time set key $K_T$ is actuated. The desired current time information is introduced into the current time information keeping circuit TR via the current time set control circuit $IC_4$. In this case, when a current time display request key $K_R$ is actuated, the contents stored in the current time information keeping circuit TR are displayed on the time information display 6 via the gate circuit $G_2$ and the display driver circuit $DSC_2$.

When, for example, the alarm set time stored in the first block $ALR_1$ of the alarm time memory ALR is identical with the current time information stored in the current time information keeping circuit TR, the coincide detection circuit $J_T$ develops the detection output for setting the first flip-flop $F_1$. The set output of the first flip-flop $F_1$ is applied to the speaker driver circuit DR via the OR gate $OR_1$ to enable the speaker SP. The set output of the first flip-flop $F_1$ is also applied to the memory block selection circuit $MS_3$ to read out the information stored in the first block of the matrix memory $M_2$. Accordingly, the written pattern stored in the first block of the matrix memory $M_2$ is displayed on the matrix display panel 4 at a preselected time which is stored in the first block $ALR_1$ of the alarm time memory ALR.

The set output of the flip-flop $F_1$ is also applied to a gate circuit $G_3$ via the OR gate $OR_1$ and an inverter circuit NOT, whereby the memory block selection circuit $MS_3$ operates without regard to the selection block selected through the block selection switch 7.

More specifically, when the first block of the matrix memory $M_2$ stores the information "MEET:3", and the first block $ALR_1$ of the alarm time memory ALR stores the set time "1:30", the matrix display panel 4 displays "MEET:3" at one, thirty. Under these conditions, when the reset switch RS is actuated, the flip-flop $F_1$ is reset and, therefore, the display of "MEET:3" and the alarm sound disappear.

(III) READ-OUT OF INFORMATION STORED IN MATRIX MEMORY $M_2$ AND ALARM TIME MEMORY ALR

The information stored in the matrix memory $M_2$ and the alarm time memory ALR can be read out at a desired time for confirmation purposes in the following manner.

The mode selection switch 5 is held at the second terminal $M_{out}$. The memory block selection circuit $MS_3$ and the alarm memory block selection circuit $MS_5$ are responsive to the output signal derived from the block selection switch 7. When, for example, the block selection switch 7 is held at the second terminal ②, the contents stored in the second block of the matrix memory $M_2$ are displayed on the matrix display panel 4, and the alarm time stored in the second block $ALR_2$ of the alarm time memory ALR is displayed on the time information display 6.

(IV) CALCULATOR OPERATION

The mode selections switch 5 is held at the third terminal CAL. The input control circuit $IC_5$ and the output control circuit $OC_2$ become operative in response to the output signal derived from the third terminal CAL. The contents stored in the operation register $M_3$ are converted into a character signal by the character pattern generator CRG, and displayed on the matrix display panel 4 via the display driver circuit $DSC_1$. Operation of the operation control circuit PU is similar to that of the conventional control circuit included in the conventional electronic calculator.

The invention being thus described, it will be obvious that the same may be varied in many ways. Such variations are not to be regarded as a departure from the spirit and scope of the invention, and all such modifications are intended to be included within the scope of the following claims.

What is claimed is:

1. An electronic display system comprising:
   a display panel;
   input means for introducing a desired pattern to be displayed on said display panel;
   a first storage means including a plurality of storage blocks for storing the introduced pattern therein;
   time information input means for introducing a desired time at which said pattern is desired to be displayed on said display panel;

a second storage means including a plurality of storage blocks for storing the introduced time information therein;

means for directly accessing one of said blocks of said first storage means and one of said blocks of said second storage means for storing said introduced pattern and said introduced time information therein;

a current time information keeping circuit for providing current time information therein;

a detection circuit means for developing a detection output when said time information stored in one of said blocks of said second storage means is identical with the current time information provided by said current time information keeping circuit; and display driver means for displaying said pattern stored in said one of said blocks of said first storage means on said display panel in response to said detection output derived from said detection circuit means.

2. The electronic display system of claim 1, wherein said display panel comprises a matrix display panel for displaying said pattern in a dot matrix fashion.

3. The electronic display system of claim 2, wherein said input means comprise a matrix input means including a plurality of sensing elements aligned in a matrix fashion for introducing a desired hand-written pattern.

4. The electronic display system of claim 3, wherein each of said plurality of blocks of said first storage means comprises a matrix memory means including a plurality of memory elements aligned in a matrix fashion which corresponds to the matrix of said matrix display panel.

5. The electronic display system of claim 4, wherein said matrix display panel displays a pattern having a predetermined length, said matrix memory means having a digit capacity corresponding to said predetermined digit length of said matrix display panel.

6. The electronic display system of claim 5, wherein one digit of said matrix display panel and said matrix memory means includes elements corresponding to said sensing elements included in said matrix input means.

7. A combination timepiece and calculator comprising:

a matrix display panel;

a current time information keeping circuit for providing current time information therein;

a computation circuit for performing calculator operations;

keyboard means for introducing desired information into said computation circuit;

matrix input means including a plurality of elements for introducing a desired hand-written pattern into said combination timepiece and calculator to be displayed on said matrix display panel;

matrix memory means including a plurality of blocks for storing said hand-written pattern therein introduced via said matrix input means;

alarm time input means for introducing a desired time at which said hand-written pattern is desired to be displayed on said matrix display panel;

alarm time memory means including a plurality of blocks for storing said desired time therein introduced via said alarm time input means;

block selection switch means on said combination timepiece and calculator for directly accessing one of said blocks of said matrix memory means and of said alarm time memory means for storage of said handwritten pattern and said desired time therein;

a detection circuit for comparing the current time information provided by said current time information keeping circuit with the desired time stored in said alarm time memory means, and for developing a detection output when said current time information is substantially identical with said desired time; and display control means for displaying said hand-written pattern stored in said matrix memory means on said matrix display panel in response to said detection output.

8. The combination timepiece and calculator of claim 7, further comprising:

a character pattern generator interposed between said computation circuit and said matrix display panel for displaying the contents of said computation circuit on said matrix display panel in a dot matrix fashion.

9. The combination timepiece and calculator of claim 7, wherein each block of said matrix memory means includes a second number of digit positions, and wherein each digit position in one block comprises memory elements corresponding to the elements of said matrix input means.

10. The combination timepiece and calculator of claim 9, wherein said matrix display panel comprises a second number of digit positions, each digit position of said matrix display panel including display elements corresponding to the elements of said matrix input means.

11. The combination timepiece and calculator of claim 7, 8, 9 or 10, further comprising:

an audio speaker; and a speaker driver circuit for activating said audio speaker in response to said detection output derived from said detection circuit.

12. The combination timepiece and calculator of claim 11, wherein a flip-flop is interposed between said detection circuit and the speaker driver circuit, said flip-flop being set by said detection output, the set output of said flip-flop being applied to said speaker driver circuit.

13. The combination timepiece and calculator of claim 12, further comprising:

a reset manual switch for resetting said flip-flop.

14. An electronic display system capable of storing and displaying a display pattern, comprising:

first selection means for selecting an input mode or an output mode in the operation of said electronic display system;

storage means including a plurality of storage blocks for storing said display pattern in one of said blocks;

second selection means for directly accessing one of said storage blocks of said storage means for storage of said display pattern therein;

matrix input means responsive to the selection of said input mode via said first selection means and to the selection of said one of said storage blocks via said second selection means for entering said display pattern into said one of said storage blocks of said storage means;

current time information keeping circuit means for maintaining and storing current time information therein;

desired time information input means for entering a desired time information into said electronic display system corresponding to the time at which said display pattern will be displayed by said electronic display system;

comparator means for comparing the current time information with the desired time information and for developing an output signal when said current time information is substantially equal to said desired time information; and matrix display means responsive to said output signal from said comparator means for retrieving said display pattern from said one of said blocks and for displaying said display pattern thereon.

15. An electronic display system in accordance with claim 14, wherein said matrix display means includes a plurality of digit positions, each digit position including a plurality of elements;

said matrix input means includes at least one digit position, the digit position of said matrix input means including a plurality of sensitive elements; and the number of elements for each digit position of said matrix display means being substantially equal to the number of sensitive elements of the digit position of said matrix input means.

16. An electronic display system in accordance with claims 14 or 15, wherein said second selection means comprises a manual block selection switch on an outer housing of said electronic display system for directly accessing said one of said blocks in said storage means for storage of said display pattern therein.

17. An electronic display system in accordance with claim 14, wherein said desired time information input means includes another storage means for storage of said desired time information therein, said another storage means including a plurality of blocks; and wherein said second selection means directly accesses one of said blocks in said another storage means for storage of said desired time information therein.

* * * * *